United States Patent [19]
Murano et al.

[11] 4,443,082
[45] Apr. 17, 1984

[54] CURRENT SIGNAL CONTROLLED CAMERA SYSTEM

[75] Inventors: Tamio Murano, Itami; Satoshi Yamane, Kobe; Toshitatsu Suzuki, Takarazuka; Yoshio Fukushima, Tokyo, all of Japan

[73] Assignee: Ricoh Company, Ltd., Japan

[21] Appl. No.: 400,623

[22] Filed: Jul. 22, 1982

[30] Foreign Application Priority Data

Jul. 23, 1981 [JP] Japan ............................ 56-109659[U]

[51] Int. Cl.³ .................... G03B 1/00; G03B 15/05; G03B 17/00
[52] U.S. Cl. .............................. 354/145.1; 354/173.1; 354/295
[58] Field of Search ................ 354/25 R, 25 A, 25 P, 354/25 N, 126, 139, 145, 149, 173, 195, 197, 286, 295; 307/151

[56] References Cited
U.S. PATENT DOCUMENTS 4,284,338  8/1981  Ikuno ........................... 354/173 X
4,298,260  11/1981 Takayama ................... 354/173 X
4,367,936  1/1983  Ichiyanagi .................... 354/173

Primary Examiner—William B. Perkey
Attorney, Agent, or Firm—Guy W. Shoup

[57] ABSTRACT

A camera system in which information is transmitted between a camera body and an accessory in the form of a current signal is provided. A voltage-to-current converter is provided in at least either one of the camera body and accessory and a current-to-voltage converter is provided in at least the other of the camera body and accessory. Thus, analog information can be transmitted between the camera body and the accessory with high accuracy even if they have separate voltage sources different in level.

10 Claims, 3 Drawing Figures

CURRENT SIGNAL CONTROLLED CAMERA SYSTEM

BACKGROUND OF THE INVENTION

1. Field of the Invention

This invention relates to a photographic camera and in particular to a camera system including an accessory-mountable camera body and one or more accessories such as an interchangeable lens, automatic wind-up device, flashing device, etc. More specifically, the present invention relates to a camera system including a camera body and at least one accessory in which a current signal is used to establish cooperation between the camera body and the accessory.

2. Description of the Prior Art

In a prior art camera system including a camera body and an accessory mounted on the camera body, a signal to be transmitted between the camera body and the accessory is generally a simple ON/OFF signal. In transmitting an analog signal from either one of the camera body and the accessory to the other, it has been required to adjust the supply voltages of the camera body and the accessory equal in level so that the system may be operated virtually by a common supply voltage. Thus, if information is to be transmitted by a simple ON/OFF signal, the contents of information are necessarily limited to rudimentary control and warning. On the other hand, if supply voltages same in level are to be used, versatility of the camera system is limited. For example, only exclusive accessories are allowed to be used for a particular type camera body.

SUMMARY OF THE INVENTION

The disadvantages of the prior art are overcome with the present invention and an improved camera system in which information is transmitted in the form of current between the camera body and the accessory is provided.

In accordance with one aspect of the present invention, there is provided a camera system in which information is transmitted in the form of current comprising: a camera body including a first voltage source; an accessory such as an interchangeable lens, automatic wind-up device and flashing device to be used in association with said camera body, said accessory including a second voltage source; a voltage-to-current converter incorporated at least in either one of said camera body and accessory for converting a voltage into a current signal; means for transmitting said current signal to the other of said camera body and accessory; and a current-to-voltage converter incorporated at least in the other of said camera body and accessory for converting said current signal thus transmitted back into a voltage signal whereby information is transmitted from either one of said camera body and accessory to the other in the form of current.

It is therefore a main object of the present invention to provide a novel camera system in which information may be transmitted between components in the form of current.

Another object of the present invention is to provide a camera system in which an analog signal may be transmitted between a camera body and an accessory with high accuracy.

A further object of the present invention is to provide a camera system abundant in versatility in using various kinds of accessories.

Other objects, advantages and novel features of the present invention will become apparent from the following detailed description of the invention when considered in conjunction with the accompanying drawings.

DESCRIPTION OF THE PREFERRED EMBODIMENTS

Figure 1:
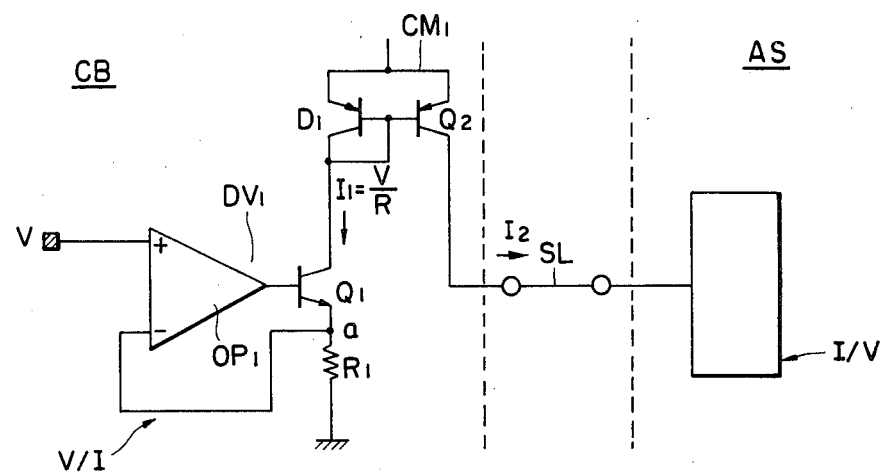
FIG. 1 is a circuit diagram showing one embodiment of the present invention.

Referring now to FIG. 1, there is shown a camera system which generally comprises a camera body CB, an accessory AS and a signal transmission line SL connected between the camera body CB and the accessory AS. In the embodiment of FIG. 1, a voltage-to-current converter V/I, which converts a voltage signal having information to be transmitted into a current signal, is provided in the camera body CB. On the other hand, the accessory AS is provided with a current-to-voltage converter I/V which converts the current signal thus transmitted back into a voltage signal. Any well known device may be used for the current-to-voltage converter I/V. The transmission line SL may be comprised of an electrically conductive material which passes a current signal therethrough.

The voltage-to-current converter V/I is comprised of three sections: a driving circuit $DV_1$, a current limiting resistor $R_1$ having resistance R and a current mirror circuit $CM_1$. The driving circuit $DV_1$ includes an operational amplifier $OP_1$ having its non-inverting input terminal connected to a voltage signal source V and its inverting input terminal connected to a node a, which is a junction between the emitter of a transistor $Q_1$ and one end of the resistor $R_1$, the other end of which is grounded. The output terminal of the operational amplifier $OP_1$ is connected to the base of the transistor $Q_1$ thereby forming a feedback circuit through the transistor $Q_1$ to the inverting input terminal. The current mirror circuit $CM_1$ includes a pair of transistors $D_1$ and $Q_2$, whose emitters and bases are commonly connected, respectively, and the transistor $D_1$ has its base connected to its collector, which is then connected to the collector of the transistor $Q_1$. The collector of the transistor $Q_2$, on the other hand, is connected to one end of the transmission line SL.

In operation, when a voltage signal V is applied to the non-inverting input terminal of the operational amplifier $OP_1$, its output is supplied to the node a by turning the transistor $Q_1$ on, whereby a current $I_1$ determined by the relation of $I_1 = V/R$ is drawn from the transistor $D_1$ to the collector of the transistor $Q_1$. Under the condition, a mirror current $I_2$ equivalent to the current $I_1$ is produced at the collector of the transistor $Q_2$. The thus produced mirror current $I_2$ is then transmitted from the camera body CB to the accessory AS through the line SL, where the current $I_2$ is converted into a voltage signal by means of the current-to-voltage converter I/V which is driven by the voltage source of the accessory.

As described above, in accordance with the present invention, even if the camera body and the accessory have separate voltage sources, an analog voltage signal generated, for example, in the camera body may be transmitted to the accessory quite accurately. That is, since information in the form of voltage is once changed to corresponding information in the form of current, even if such information is to be transmitted from a first section, either one of the camera body and accessory, having a first voltage source to a second section, the other of the camera body and accessory, having a second voltage source different in level from the first voltage source, an appropriate voltage signal having desired information and commensurate with the level of the second voltage source may be obtained with high accuracy at the second section. Accordingly, compared with the prior art which allows to transmit only a simple control signal such as an ON/OFF signal, the present invention allows to carry out a complex control with high accuracy, for example, when applied to an autofocusing system or automatic zooming system of a single lens reflex type camera. Besides, the present invention also allows to carry out fine adjustments in flashing operation in response to the brightness of an object to be photographed.

In the embodiment shown in FIG. 1, the voltage-to-current converter V/I is provided in the camera body CB and the current-to-voltage converter I/V is provided in the accessory AS. It should be noted, however, that the voltage-to-current converter V/I may be provided in the accessory AS with the current-to-voltage converter I/V provided in the camera body CB.

Figure 2:
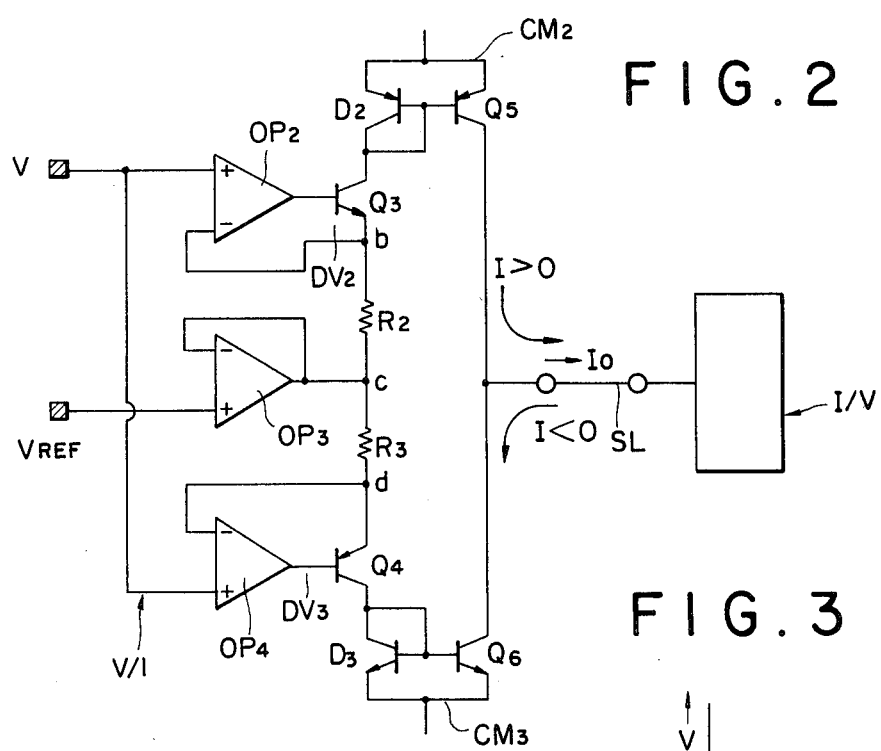
FIG. 2 is a circuit diagram showing another embodiment of the present invention.
Figure 3:
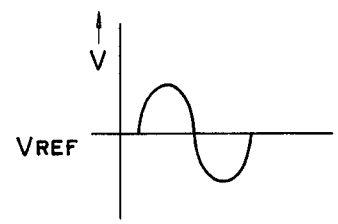
FIG. 3 is a graph useful for understanding the operation of the embodiment shown in FIG. 2.

FIG. 2 shows another embodiment of the present invention, the overall structure of which is similar to the first embodiment. In the embodiment of FIG. 2, however, the voltage-to-current converter V/I comprises a first driver circuit $DV_2$, an operational amplifier $OP_3$ having its output terminal connected to its inverting input terminal to form a voltage follower, a second driver circuit $DV_3$, a first current mirror circuit $CM_2$ and a second current mirror circuit $CM_3$. As shown, the first driver circuit $DV_2$ includes an operational amplifier $OP_2$ having its non-inverting input terminal connected to a voltage signal source V and an NPN transistor $Q_3$ having its base connected to the output terminal of the operational amplifier $OP_2$. The emitter of the transistor $Q_3$ is connected to a node b which is also connected to the inverting input terminal of the operational amplifier $OP_2$ thereby forming a feedback circuit. The node b is connected through a resistor $R_2$ to a node c which is also connected to the output terminal of the operational amplifier $OP_3$ having its non-inverting input terminal connected to receive a reference voltage $V_{REF}$.

The second driver circuit $DV_3$ includes an operational amplifier $OP_4$ having its inverting input terminal connected to a node d which is connected to the node c through a resistor $R_3$ and its non-inverting input terminal connected to the voltage signal source V. The circuit $DV_3$ also includes a PNP transistor $Q_4$ having its emitter connected to the node d and its base connected to the output terminal of the operational amplifier $OP_4$. It is assumed that either of the resistors $R_2$ and $R_3$ has a resistive value R. The first current mirror circuit $CM_2$ includes a pair of transistors $D_2$ and $Q_5$ having their emitters and bases commonly connected, respectively. The transistor $D_2$ has its base connected to its collector which is then connected to the collector of the transistor $Q_3$. On the other hand, the second current mirror circuit $CM_3$ includes a pair of transistors $D_3$ and $Q_6$ having their emitters and bases commonly connected, respectively. The transistor $D_3$ has its base connected to it collector which is then connected to the collector of the transistor $Q_4$. Besides, the collector of the transistor $Q_5$ is connected to the collector of the transistor $Q_6$ and the commonly connected collectors are then connected to one end of the transmission line SL.

In operation, when a voltage signal V is applied to the non-inverting input terminals of the operational amplifiers $OP_2$ and $OP_4$, it is transmitted to the nodes b and d through the driver circuits $DV_2$ and $DV_3$, respectively. On the other hand, the reference voltage $V_{REF}$ applied to the non-inverting input terminal of the operational amplifier $OP_3$ is transmitted to the node c. Under the condition, if the voltage signal V is larger than the reference voltage $V_{REF}$, i.e., $V > V_{REF}$, the current $I = (V - V_{REF})/R$ tends to flow from the nodes b and d to the node c. However, due to the characteristics of the PNP transistor $Q_4$, it is in a non-conducting state, so that the above current I flows only from the node b to the node c through the transistor $Q_3$. That is, $I = (V - V_{REF})/R > 0$. This current is mirrored as a collector current I of the transistor $Q_5$. It is hereby assumed that the current I thus produced constitutes a current signal $I_0$ directed in the positive direction along the transmission line SL, i.e., $I_0 = I > 0$.

Next, if the voltage signal V is equal to the reference voltage $V_{REF}$, i.e., $V = V_{REF}$, no current flow is produced because the potentials at the nodes b, c and d are all identical, i.e., $I = (V - V_{REF})/R = 0$. Since no current passes through the transistors $Q_3$ and $Q_4$, no mirror current is produced by either of the current mirror circuits $CM_2$ and $CM_3$, and, thus, $I_0 = 0$.

If the voltage signal V is smaller than the reference voltage $V_{REF}$, i.e., $V < V_{REF}$, there appears a situation in which the current $I = (V_{REF} - V)/R$ tends to flow from the node c to the nodes b and d. However, since the NPN transistor $Q_3$ is off at this time, the above current I flows only from the node c to the node d through the transistor $Q_4$. This current is then mirrored into a collector current of the transistor $Q_6$. The output current $I_0$ under the circumstances is opposite in direction as compared with the case where $V > V_{REF}$ and it is assumed that the direction of this output current is negative, i.e., $I_0 = I < 0$.

In this manner, in the embodiment of FIG. 2, the current signal varying in sign as well as in magnitude may be obtained depending upon the magnitude of the voltage signal V in comparison with the reference voltage $V_{REF}$. This structure is extremely advantageous when applied to control the reciprocating motion of a lens by means of a motor. That is, the motor may be rotated in the normal or reversed direction in response to the sign of the current signal thereby moving the lens forward or backward with stopping the rotation while the current signal is zero. The magnitude of the voltage signal V in comparison with the reference voltage $V_{REF}$ may be used to vary the rotational speed of the motor.

While the above provides a full and complete disclosure of the preferred embodiments of the present invention, various modifications, alternate constructions and equivalents may be employed without departing from the true spirit and scope of the invention. Therefore, the above description and illustration should not be constued as limiting the scope of the invention, which is defined by the appended claims.

What is claimed is:

1. A camera system in which information is transmitted in the form of current comprising:
   a camera body including a first voltage source;
   an accessory to be used in association with said camera body, said accessory including a second voltage source;
   a voltage-to-current converter incorporated in at least either one of said camera body and accessory for converting a voltage into a current signal;
   means for transmitting said current signal to the other of said camera body and accessory; and
   a current-to-voltage converter incorporated in at least the other of said camera body and accessory for converting said current signal thus transmitted back into a voltage signal whereby information is transmitted from either one of said camera body and accessory to the other in the form of current.

2. The camera system of claim 1 wherein said accessory is mountable on said camera body.

3. The camera system of claim 1 or 2 wherein said accessory includes such a component as an interchangeable lens, automatic wind-up device, or flashing device.

4. The camera system of claim 1 wherein said voltage-to-current converter includes a driver circuit to which a voltage signal to be transmitted is applied and a current mirror circuit driven by said driver circuit to produce a mirror current as a current signal corresponding to said voltage signal.

5. The camera system of claim 4 wherein said driver circuit includes an operational amplifier having its non-inverting input terminal connected to a voltage signal source and an NPN transistor having its base connected to the output terminal of said operational amplifier with its emitter connected to the inverting input terminal of said operational amplifier.

6. The camera system of claim 5 wherein said current mirror circuit includes a pair of PNP transistors having their emitters and bases commonly connected, respectively, and one of said paired transistors has its base connected to its collector which is connected to the collector of said transistor of said driver circuit.

7. The camera system of claim 5 or 6 wherein the emitter of said transistor of said driver circuit is connected to ground through a resistor.

8. The camera system of claim 1 wherein said voltage-to-current converter includes first and second driver circuits, to each of which is applied a voltage signal having information to be transmitted, and first and second current mirror circuits, said first and second driver circuits being connected in series between said first and second current mirror circuits with the junction between said first and second driver circuits being maintained at a reference potential.

9. The camera system of claim 8 wherein said first driver circuit includes a first NPN transistor having its collector connected to said first current mirror circuit and its emitter connected to said junction through a first resistor and a second PNP transistor having its emitter connected to said junction through a second resistor and its collector connected to said second current mirror circuit.

10. The camera system of claim 9 wherein said first and second resistors have the same resistance.

* * * * *

UNITED STATES PATENT AND TRADEMARK OFFICE
CERTIFICATE OF CORRECTION

PATENT NO. : 4,443,082
DATED : April 17, 1984
INVENTOR(S) : Murano et al

It is certified that error appears in the above-identified patent and that said Letters Patent is hereby corrected as shown below:

Column 6, line 1, change "an" to -- a --.
Column 6, line 27, change "PNP" to -- NPN --.

Signed and Sealed this

Seventh Day of April, 1987

Attest:

DONALD J. QUIGG

*Attesting Officer*  *Commissioner of Patents and Trademarks*